United States Patent
Song et al.

(10) Patent No.: US 11,682,972 B2
(45) Date of Patent: Jun. 20, 2023

(54) PEAK CURRENT MODE CONTROL FOR BUCK-BOOST REGULATORS

(71) Applicant: Analog Devices, Inc., Wilmington, MA (US)

(72) Inventors: Min Kyu Song, Milpitas, CA (US); Min Chen, Fremont, CA (US)

(73) Assignee: Analog Devices, Inc., Wilmington, MA (US)

( * ) Notice: Subject to any disclaimer, the term of this patent is extended or adjusted under 35 U.S.C. 154(b) by 171 days.

(21) Appl. No.: 17/167,548

(22) Filed: Feb. 4, 2021

(65) Prior Publication Data

US 2022/0247313 A1     Aug. 4, 2022

(51) Int. Cl.
*H02M 3/158* (2006.01)
*G05F 1/62* (2006.01)

(52) U.S. Cl.
CPC ............ *H02M 3/1582* (2013.01); *G05F 1/62* (2013.01)

(58) Field of Classification Search
CPC .. H02M 1/12; H02M 3/3155; H02M 3/33507; H02M 3/33546; H02M 7/1557; H02M 7/1626; H02M 1/4208; H02M 7/53871; H02M 7/12; H02M 7/219; H02M 7/151; H02M 1/4233; H02M 5/4585; H02M 7/217; H02M 1/08; H02M 7/1552;
(Continued)

(56) References Cited

U.S. PATENT DOCUMENTS

| 5,402,060 A | 3/1995 | Erisman |
| 6,037,755 A | 3/2000 | Mao et al. |

(Continued)

FOREIGN PATENT DOCUMENTS

| CN | 101499718 | 8/2009 |
| CN | 108054918 B | 4/2020 |

(Continued)

OTHER PUBLICATIONS

U.S. Appl. No. 17/220,622, filed Apr. 1, 2021, Peak-Buck Peak-Boost Current-Mode Control for Switched Step-Up Step-Down Regulators.

(Continued)

*Primary Examiner* — Thienvu V Tran
*Assistant Examiner* — Nusrat Quddus
(74) *Attorney, Agent, or Firm* — Schwegman Lundberg & Woessner, P.A.

(57) ABSTRACT

Controller circuitry can employ a method to provide control signals to bridge switches operating an inductor for switched-mode inductive buck-boost voltage regulation. The buck mode can operate the bridge switches in a buck current control mode when the input voltage exceeds the output voltage. The boost mode can operate the bridge switches in a boost current control mode when the output voltage exceeds the input voltage. The buck-boost transition mode can operate the bridge switches in a peak buck-boost current control mode that minimizes a minimum duty cycle (having a minimum "on" duty time and a minimum "off" duty time) when the output voltage is approximately equal to the input voltage during a transition from at least one of the current control buck mode to the current control boost mode or from the current control boost mode to the current control buck mode.

18 Claims, 10 Drawing Sheets

(58) Field of Classification Search
CPC ............ H02M 7/1623; H02M 1/4225; H02M
3/33592; H02M 3/073; H02M 3/10;
H02M 3/135; H02M 3/137; H02M 7/10;
H02M 7/00; H02M 7/06; H02M 7/068;
H02M 7/064; H02M 3/1582; H02M
3/1584; H02M 3/285; H02M 3/33561;
H02M 7/49; H02M 1/045; H02M 7/006;
H02M 7/153; H02M 1/088; H02M 7/103;
H02M 7/106; H02M 7/19; H02M 7/08;
H02M 7/17; H02M 2001/007; H02M
7/493; H02M 7/53806; H02M 7/5381;
H02M 7/483; H02M 7/538466; H02M
7/5387; H02M 7/53873; H02M 7/53875;
H02M 1/084; H02M 1/0845; H02M
5/2573; H02M 1/081; H02M 5/293;
H02M 3/125; H02M 3/13; H02M 3/145;
H02M 3/15; H02M 3/155; H02M 3/156;
H02M 3/158; H02M 3/1588; H02M
2003/1566; H02M 2003/1557; G05F
1/00; G05F 1/10; G05F 1/12; G05F 1/46;
G05F 1/455; G05F 1/45; G05F 1/445;
G05F 1/66; G05F 1/40; G05F 1/42; G05F
1/44; G05F 1/462; G05F 1/52; G05F
1/56; G05F 3/10; G05F 3/16; G05F 3/18;
G05F 3/185; G05F 3/20; G05F 3/26;
G05F 3/30; G05F 3/205; G05F 3/22;
G05F 3/24; G05F 3/222; G05F 3/242;
G05F 3/225; G05F 3/227; G05F 3/245;
G05F 3/247; G05F 3/262; G05F 3/265;
G05F 3/267; G05F 1/575; G05F 1/32;
G05F 1/34; G05F 1/38; G05F 1/30; G05F
1/33; H02J 7/12; H02J 3/38; H02J 3/46;
H04B 2215/069; H05B 39/048; B23K
11/24
See application file for complete search history.

(56) References Cited

U.S. PATENT DOCUMENTS

| | | | |
|---|---|---|---|
| 6,087,816 A | 7/2000 | Volk | |
| 6,166,527 A | 12/2000 | Dwelley et al. | |
| 6,275,016 B1 | 8/2001 | Ivanov | |
| 6,348,779 B1 | 2/2002 | Sluijs | |
| 6,788,033 B2 | 9/2004 | Vinciarelli | |
| 6,812,676 B2 | 11/2004 | Tateishi | |
| 7,106,035 B2 | 9/2006 | Xing | |
| 7,116,085 B2 | 10/2006 | Ikezawa | |
| 7,196,499 B1 | 3/2007 | Lipcsei | |
| 7,256,570 B2 | 8/2007 | Zhou et al. | |
| 7,298,119 B1 | 11/2007 | Amram Summit et al. | |
| 7,394,231 B2 | 7/2008 | Flatness et al. | |
| 7,872,456 B2 | 1/2011 | Li et al. | |
| 8,143,865 B2 | 3/2012 | Grant | |
| 8,179,113 B2 | 5/2012 | Singnurkar | |
| 8,415,937 B2 | 4/2013 | Hester | |
| 8,436,591 B2 | 5/2013 | Dearn | |
| 8,723,490 B2 | 5/2014 | Moussaoui et al. | |
| 8,928,302 B2 | 1/2015 | Namekawa | |
| 9,088,211 B2 | 7/2015 | Ivanov et al. | |
| 9,379,621 B1 * | 6/2016 | Kalyanaranman | H02M 3/33507 |
| 9,425,692 B2 | 8/2016 | Bernon-enjalbert et al. | |
| 9,621,041 B2 * | 4/2017 | Sun | H02M 3/1582 |
| 9,647,557 B2 | 5/2017 | Miianesi et al. | |
| 9,882,489 B2 | 1/2018 | Li | |
| 10,075,075 B2 | 9/2018 | Zhang | |
| 10,122,168 B2 | 11/2018 | Goncalves et al. | |
| 10,355,596 B2 | 7/2019 | Choquet | |
| 10,594,218 B1 * | 3/2020 | Zhan | G05F 1/62 |
| 10,637,357 B1 * | 4/2020 | Zhan | H02M 3/157 |
| 10,651,722 B2 | 5/2020 | Yang et al. | |
| 11,038,425 B2 * | 6/2021 | Luff | H02M 3/1582 |
| 11,303,212 B2 | 4/2022 | Chen et al. | |
| 11,418,119 B2 * | 8/2022 | Xie | H02M 3/1582 |
| 2006/0055384 A1 | 3/2006 | Jordan et al. | |
| 2006/0284606 A1 | 12/2006 | Chen et al. | |
| 2009/0108823 A1 | 4/2009 | Ho et al. | |
| 2010/0052611 A1 | 3/2010 | Lyle, Jr. | |
| 2011/0169466 A1 * | 7/2011 | Kuan | H02M 3/1582 323/282 |
| 2011/0187336 A1 | 8/2011 | Wu et al. | |
| 2011/0199062 A1 | 8/2011 | Singnurkar | |
| 2011/0227550 A1 | 9/2011 | Walters et al. | |
| 2011/0279098 A1 | 11/2011 | Ren et al. | |
| 2012/0176824 A1 | 7/2012 | Franklin et al. | |
| 2014/0084833 A1 | 3/2014 | Aghili | |
| 2014/0084883 A1 | 3/2014 | Tanabe et al. | |
| 2014/0167648 A1 * | 6/2014 | Hsiu | H05B 45/375 315/299 |
| 2014/0217996 A1 | 8/2014 | Peker et al. | |
| 2014/0354250 A1 | 12/2014 | Deng | |
| 2015/0162835 A1 | 6/2015 | Hang | |
| 2015/0223215 A1 * | 8/2015 | Kim | H04L 5/0053 370/329 |
| 2015/0381039 A1 * | 12/2015 | Hari | H02M 1/15 323/271 |
| 2016/0164411 A1 | 6/2016 | Chen et al. | |
| 2016/0233767 A1 * | 8/2016 | Sun | H02M 3/1582 |
| 2016/0365790 A1 * | 12/2016 | Ye | H02M 3/1582 |
| 2017/0155324 A1 * | 6/2017 | Choquet | H02M 3/1582 |
| 2017/0279359 A1 * | 9/2017 | Goncalves | H02J 3/00 |
| 2019/0131877 A1 * | 5/2019 | Luff | H02M 1/08 |
| 2019/0326814 A1 | 10/2019 | Cho et al. | |
| 2020/0076306 A1 * | 3/2020 | Pullen | H02M 1/08 |
| 2021/0050787 A1 * | 2/2021 | La Rosa | H02M 3/1582 |
| 2021/0226535 A1 | 7/2021 | Chen et al. | |

FOREIGN PATENT DOCUMENTS

| | | | |
|---|---|---|---|
| CN | 115485960 A | 12/2022 | |
| EP | 1635445 A2 * | 3/2006 | ............ H02M 3/158 |
| EP | 1689070 A2 | 8/2006 | |
| EP | 3002860 A1 | 4/2016 | |
| EP | 3002861 A1 | 4/2016 | |
| EP | 3198710 A1 * | 8/2017 | .......... H02M 3/1582 |
| EP | 3002860 B1 | 6/2020 | |
| WO | WO-2012109680 A2 | 8/2012 | |
| WO | WO-2022169487 A1 | 8/2022 | |

OTHER PUBLICATIONS

"U.S. Appl. No. 14/660,739, Advisory Action dated Feb. 14, 2017", 3 pgs.
"U.S. Appl. No. 14/660,739, Advisory Action dated Apr. 12, 2019", 3 pgs.
"U.S. Appl. No. 14/660,739, Advisory Action dated Jun. 14, 2018", 3 pgs.
"U.S. Appl. No. 14/660,739, Advisory Action dated Oct. 12, 2017", 3 pgs.
"U.S. Appl. No. 14/660,739, Appeal Brief filed Jun. 14, 2019", 11 pgs.
"U.S. Appl. No. 14/660,739, Appeal Decision mailed Feb. 1, 2021", 8 pgs.
"U.S. Appl. No. 14/660,739, Applicant's Summary of Examiner Interview filed Mar. 7, 2018", 1 pg.
"U.S. Appl. No. 14/660,739, Examiner Interview Summary dated Feb. 6, 2018", 3 pgs.
"U.S. Appl. No. 14/660,739, Final Office Action dated Jan. 17, 2019", 33 pgs.
"U.S. Appl. No. 14/660,739, Final Office Action dated Apr. 5, 2018", 30 pgs.
"U.S. Appl. No. 14/660,739, Final Office Action dated Aug. 3, 2017", 30 pgs.
"U.S. Appl. No. 14/660,739, Final Office Action dated Nov. 30, 2016", 23 pgs.

(56) References Cited

OTHER PUBLICATIONS

"U.S. Appl. No. 14/660,739, Non Final Office Action dated Apr. 10, 2017", 28 pgs.
"U.S. Appl. No. 14/660,739, Non Final Office Action dated Jun. 30, 2016", 19 pgs.
"U.S. Appl. No. 14/660,739, Non Final Office Action dated Jul. 24, 2018", 30 pgs
"U.S. Appl. No. 14/660,739, Non Final Office Action dated Nov. 3, 2017", 27 pgs.
"U.S. Appl. No. 14/660,739, Response filed Jan. 30, 2017 to Final Office Action dated Nov. 30, 2016", 15 pgs.
"U.S. Appl. No. 14/660,739, Response filed Jan. 30, 2018 to Non Final Office Action dated Nov. 3, 2017", 18 pgs.
"U.S. Appl. No. 14/660,739, Response filed Mar. 23, 2017 to Advisory Action dated Feb. 14, 2017", 15 pgs.
"U.S. Appl. No. 14/660,739, Response filed May 21, 2018 to Final Office Action dated Apr. 5, 2018", 13 pgs.
"U.S. Appl. No. 14/660,739, Response filed Jun. 29, 2017 to Non Final Office Action dated Apr. 10, 2017", 16 pgs.
"U.S. Appl. No. 14/660,739, Response filed Jul. 2, 2018 to Advisory Action dated Jun. 14, 2018", 15 pgs.
"U.S. Appl. No. 14/660,739, Response filed Sep. 30, 2017 to Final Office Action dated Aug. 3, 2017", 16 pgs.
"U.S. Appl. No. 14/660,739, Response filed Oct. 24, 2018 to Non Final Office Action dated Jul. 24, 2018", 14 pgs.
"U.S. Appl. No. 14/660,739, Response filed Oct. 29, 2016 to Non Final Office Action dated Jun. 30, 2016", 14 pgs.
"U.S. Appl. No. 14/660,739 Response to Final Office Action filed on Apr. 2, 2019", 14 pgs.
"European Application Serial No. 15002058.4, Communication pursuant to Article 94(3) EPC dated Jun. 26, 2017", 6 pgs.
"European Application Serial No. 15002058.4, Communication Pursuant to Article 94(3) EPC dated Jul. 2, 2019", 11 pgs.
"European Application Serial No. 15002058.4, Extended European Search Report dated Mar. 3, 2016", 7 pgs.
"European Application Serial No. 15002058.4, Response filed Oct. 6, 2016 to Extended European Search Report dated Mar. 3, 2016", 18 pgs.
"European Application Serial No. 15002058.4, Response filed Oct. 25, 2019 to Communication Pursuant to Article 94(3) EPC dated Jul. 2, 2019", 41 pgs.
"European Application Serial No. 15002058.4, Response filed Nov. 3, 2017 to Communication Pursuant to Article 94(3) EPC dated Jun. 26, 2017", 18 pgs.
"European Application Serial No. 15002415,6, Communication Pursuant to Article 94(3) EPC dated Jul. 2, 2019", 14 pgs.
"European Application Serial No. 15002415.6, Communication Pursuant to Article 94(3) EPC dated Aug. 9, 2017", 6 pgs.
"European Application Serial No. 15002415.6, Communication Pursuant to Article 94(3) EPC dated Dec. 13, 2019", 6 pgs.
"European Application Serial No. 15002415.6, Extended European Search Report dated Mar. 3, 2016", 8 pgs.
"European Application Serial No. 15002415.6, Response filed Apr. 14, 2020 to Communication Pursuant to Article 94(3) EPC dated Dec. 13, 2019", 16 pgs.
"European Application Serial No. 15002415.6, Response filed Aug. 18, 2016 to Extended European Search Report dated Mar. 3, 2016", 21 pgs.
"European Application Serial No. 15002415.6, Response filed Oct. 25, 2019 to Communication Pursuant to Article 94(3) EPC dated Jul. 2, 2019", 19 pgs.
"European Application Serial No. 15002415.6, Response filed Dec. 5, 2017 to Communication Pursuant to Article 94(3) EPC dated Aug. 9, 2017", 14 pgs.
"Taiwanese Application Serial No. 104125360, Office Action dated Sep. 9, 2016", 8 pgs.
Park, Jinseok, et al., "10MHz Current Mode 4 Switch Buck Boost Converter (4SBBC) for Polar Modulation", IEEE, (2008), 1977-1983.
"U.S. Appl. No. 17/220,622, Notice of Allowance dated Dec. 24, 2021", 11 pgs.
"International Application Serial No. PCT/US2021/047903, International Search Report dated Dec. 23, 2021", 4 pgs.
"International Application Serial No. PCT/US2021/047903, Written Opinion dated Dec. 23, 2021", 5 pgs.
"U.S. Appl. No. 17/220,622, Corrected Notice of Allowability dated Feb. 16, 2022", 2 pgs.

* cited by examiner

PEAK CURRENT MODE CONTROL FOR BUCK-BOOST REGULATORS

TECHNICAL FIELD

This document pertains generally, but not by way of limitation, to the field of power management and more particularly, but not by way of limitation, to a fixed frequency symmetric peak current mode control scheme such as for 4-switch buck-boost regulators.

BACKGROUND

Voltage regulators are used to maintain a constant voltage. A switching voltage regulator can be used to convert a DC input voltage to an AC output voltage, or can be used to convert one DC voltage level to another DC voltage level. A buck regulator can be used to step down, or buck, the input voltage and a boost regulator can be used to step up, or boost, the input voltage.

An inductive voltage regulator can be set up to run in different modes, such as depending on the load that is connected to the input and output. Continuous Conduction Mode (CCM) is characterized by the current flowing continuously across the inductor energy storage element. In a Discontinuous Conduction Mode (DCM) the current across the inductor energy storage element can go to zero. DCM modes include burst mode and pulse skip mode. Burst mode and pulse skip mode can be used for saving power when the load needs very little current. In burst-mode operation, the regulator operates for a period of time, charges up an output capacitor to a set threshold voltage, and then shuts down completely. When the output voltage across the output capacitor sags below a set threshold voltage, the converter turns back on and the cycle restarts. This works well when there is little load current such that the converter can "sleep" for a significant period of time before it has to turn on again.

Pulse skip mode is similar to burst-mode and allows for limiting the output voltage or current to be within a maximum permitted margin. This is used when the load is smaller in order to reduce switching losses. For example, this is a useful mode for a continuously low load such as when the desired output voltage is similar to the input voltage.

Voltage regulators that use valley current mode control (e.g., operating using valley-buck peak-boost current mode control or peak-buck valley-boost current mode control) cannot implement efficient Discontinuous-Conduction Mode (DCM) operation. In valley current mode control, a reverse inductor current $I_L$ can trip the control comparator before the valley current value of the inductor current $I_L$ occurs. This can leave the device without any available zero valley inductor current detection in DCM mode. Without reverse inductor current $I_L$ sensing capability, it is difficult to implement in DCM.

To address this issue of DCM operation, a peak-buck peak-boost type current mode control scheme can be used, which only modulates one side of the switching duty ratio, either peak buck or peak boost. The other side of the switching duty ratio is kept fixed. One-sided modulation of the switching duty ratio can help overcome the drawbacks in the previous valley current mode but suffers from a large inductor current $I_L$ ripple and more power loss. A large $I_L$ ripple can degrade transient dynamic performance of the power converter.

SUMMARY

Recognizing these drawbacks, the present inventors describe an improved-performance symmetric peak current control scheme. The present approach can reduce or optimize $I_L$ ripple. It can help enhance the power efficiency of synchronous 4-switch buck-boost regulators. The proposed symmetric peak-buck peak-boost current control can help provide a seamless transition between Continuous Conduction Mode (CCM) and discontinuous conduction mode (DCM) operation and can allow for easy DCM implementation. The present control scheme can be more suitable for DCM, for pulse skipping, for providing low inductor current $I_L$ and better power efficiency—particularly for light load conditions. The present approach can also allow for a fixed output voltage even when the input voltage fluctuates above or below the output.

Compared to a different approach of using one-side fixed switching duty ratios, this approach can provide better power efficiency. When only one side of the switching duty ratio is modulated, either peak buck or peak boost, then there is a larger margin for the "on" duty time required on the fixed side to the minimum duty ratio which results in a large inductor current $I_L$ ripple. A large $I_L$ ripple results in more power loss and can degrade transient dynamic performance of the power converter. The present aspect uses a symmetric slope compensation circuitry to set the minimum on-time periods for synchronous 4-switch buck-boost regulators, which results in a minimum switching duty ratio. A minimum switching duty ratio leads to a low IL ripple and better power efficiency. Therefore, along with easy DCM implementation and seamless transition between CCM and DCM, the present aspect of the invention also has better device performance and power efficiency due to low IL ripple compared to aspects of the invention that fix one side of the switching duty ratio.

An illustrative, non-limiting numbered list of various aspects of the present disclosure is provided below.

Aspect 1 can include or use subject matter (such as an apparatus, a system, device, method, article of manufacture, e.g., such as can include a machine-readable medium with encoded instructions for operating a device or performing a method) that can include or use circuitry for providing switched-mode inductive buck-boost voltage regulation via a H-bridge arrangement of an inductor, a resistor, and a group of bridge switches. The H-bridge can include an input terminal receiving an input signal and an output terminal providing an output signal, the circuitry comprising controller circuitry. The controller circuitry can operate the group of bridge switches selectively such as using a buck mode, a boost mode, and a buck-boost mode, such as by providing respective mode selection signals to a set of buck bridge switches and a set of boost bridge switches in the group of bridge switches. The controller circuitry can include a buck mode, in which operating the set of buck bridge switches is determined by a peak buck current mode control scheme and the set of boost bridge switches uses 0% of an "on" duty time of a duty cycle, a boost mode, in which operating the set of boost bridge switches is determined by a peak boost current mode control scheme and the set of buck bridge switches uses 0% of an "off" duty time of the duty cycle, and a buck-boost mode, in which operating the set of buck bridge switches is determined by the peak buck current mode control scheme and the set of boost bridge switches are determined by the peak boost current mode control scheme, operating concurrently to at least one of: (1) minimize the "on" duty time for the set of boost bridge switches or (2) minimize "off" duty time for the set of buck bridge switches when the output signal is equal to the input signal.

Aspect 2 can include or use, or can optionally be combined with the subject matter of Aspect 1, to optionally include or use symmetric slope compensation circuitry as part of the controller circuitry to determine the timing of a peak buck current trip and of a peak boost current trip to equalize the "on" duty time for the set of boost bridge switches to the "off" duty time of the set of buck bridge switches in the buck-boost mode when the output signal is equal to the input signal.

Aspect 3 can include or use, or can optionally be combined with the subject matter of any of Aspects 1 or 2, to optionally include or use, the "on" duty time for the set of boost bridge switches and the "off" duty time for the set of buck bridge switches to determine a maximum switching duty ratio.

Aspect 4 can include or use, or can optionally be combined with the subject matter of any of Aspects 1-3, to optionally include or use a clock circuit configured to generate a clock pulse in response to a slope compensation signal reaching a reference voltage, wherein the clock pulse determines a start of a duty cycle.

Aspect 5 can include or use, or can optionally be combined with the subject matter of any of Aspects 1-4, to optionally include or use the controller circuitry including or being coupled to a first comparator and a second comparator, wherein: (A) the first comparator is used to provide a first comparator output based on a difference between (1) the input signal and (2) the output signal modified by the maximum switching duty ratio; (B) the second comparator is used to provide a second comparator output based on a difference between (1) the output signal and (2) the input signal modified by the maximum switching duty ratio; and wherein the first comparator output and the second comparator output are used to select between operation in the buck mode, the boost mode, or the buck-boost mode.

Aspect 6 can include or use, or can optionally be combined with the subject matter of any of Aspects 1-5, to optionally include or use a resistor in series with the inductor for sensing a current of the inductor.

Aspect 7 can include or use, or can optionally be combined with the subject matter of any of Aspects 1-6, to optionally include or use a controller circuitry which includes multiple comparisons operating together for minimizing the "on" duty time for the set of boost bridge switches and minimizing the "off" duty time for the set of buck bridge switches.

Aspect 8 can include or use, or can optionally be combined with the subject matter of any of Aspects 1-7, to optionally include or use a voltage divider that derives a DC offset voltage from a reference voltage to determine a peak boost duty cycle to maintain a peak buck duty cycle at its maximum.

Aspect 9 can include or use, or can optionally be combined with the subject matter of any of Aspects 1-8, to optionally include or use a symmetric slope compensation circuitry to determine a minimum duty cycle for a switched-mode inductive buck-boost voltage regulator. The minimum duty cycle is determined by providing a reference signal and splitting the reference signal into a first reference signal and a second reference signal, comparing a slope compensation signal with the first reference signal to determine the minimum duty cycle for peak boost current mode, comparing the slope compensation signal with the second reference signal to determine a maximum duty cycle for peak buck current mode. The DC offset voltage is determined by using the first reference signal and the second reference signal. The peak boost current trip time and a peak buck current trip timing s determined by using the DC offset voltage. The peak boost current trip corresponds with a minimum duty cycle and a peak buck current trip corresponds with a maximum duty cycle are determined in response to an output signal being equal to an input signal. A duty cycle for peak boost current mode is determined by using the DC offset voltage so that the duty cycle for peak buck current mode stays at its maximum when an output signal becomes higher than an input signal. A duty cycle for peak buck current mode is determined using the DC offset voltage so that the duty cycle for peak boost current mode stays at its maximum when the output signal becomes lower than the input signal. A transition point of peak boost current mode to peak buck current mode is determined by using a "on" duty time period for the duty cycle.

Aspect 10 can include or use subject matter (such as an apparatus, a system, device, method, article of manufacture, e.g., such as can include machine-readable medium with encoded instructions for operating a device or performing a method) or can optionally be combined with any of Aspects 1-9, such as can include or use a method of using a voltage regulator to smoothly transition between discontinuous conduction mode (DCM) and continuous conduction mode (CCM), such as by sensing an inductor current, selecting an operating mode of the voltage regulator to be one of peak buck current control mode, peak boost current control mode, or buck-boost current control mode based at least in part on an input signal, an output signal, and at least one of a minimum "on" duty time period for a set of boost control bridge switches or a minimum "off" duty time period for a set of buck control bridge switches, and transitioning the voltage regulator into DCM in response to the inductor current becoming zero or out of DCM in response to the inductor current becoming non-zero.

Aspect 11 can include or use, or can optionally be combined with the subject matter of any of Aspects 1-10, to optionally include or use the buck-boost current control mode such as by measuring a first voltage of a slope compensation signal and comparing the first voltage of the slope compensation signal with a second voltage of a first reference signal to determine a minimum "on" duty time for peak boost current control mode, and comparing the first voltage of the slope compensation signal with a second reference signal to determine a minimum "off" duty time period for peak buck current control mode.

Aspect 12 can include or use, or can optionally be combined with the subject matter of any of Aspects 1-11, to optionally include or use determining a minimum duty cycle such as by splitting a reference voltage into a first reference voltage and a second reference voltage, determining a DC offset voltage using the first reference voltage and the second reference voltage, determining a maximum time for a duty cycle using the DC offset voltage, comparing the voltage of a slope compensation signal with a difference of the voltage of a first reference signal and a second reference signal to determine a peak boost time as a portion of the duty cycle, and comparing the voltage of a slope compensation signal with the second reference voltage, wherein the second reference voltage is derived from an input reference voltage, to determine an "on" duty time period for buck control bridge switches that is a symmetrical proportion of the duty cycle to the minimum "on" duty time period for boost control bridge switches.

Aspect 13 can include or use, or can optionally be combined with the subject matter of any of Aspects 1-12, to optionally include or use a peak buck current trip timing such as can be determined by using the DC offset voltage so that a peak boost current trip occurs at the minimum "on" duty time period for the peak boost current control mode and a peak buck current trip occurs at the minimum "off" duty time period for the peak buck current control mode when the output signal is approximately equal to the input signal.

Aspect 14 can include or use, or can optionally be combined with the subject matter of any of Aspects 1-13, to optionally include or use selecting the operating mode of the voltage regulator, such as can further include determining at least one of a clock signal, or an input signal and an output signal.

Aspect 15 can include or use, or can optionally be combined with the subject matter of any of Aspects 1-14, to optionally include or use selecting the operating mode such as by determining a difference between the input signal and output signal.

Aspect 16 can include or use, or can optionally be combined with the subject matter of any of Aspects 1-15, to optionally include or use comparing a slope compensation signal with a first reference signal to determine a minimum "on" duty time period for peak buck, and comparing the slope compensation signal with a second reference signal to determine a minimum "off" duty time period for peak boost.

Aspect 17 can include or use, or can optionally be combined with the subject matter of any of Aspects 1-16, to optionally include or use an indication of a sensed inductor current summed with a slope compensation signal to produce a summed signal, and the summed signal used as an input for determining the operating mode.

Aspect 18 can include or use, or can optionally be combined with the subject matter of any of Aspects 1-17, to optionally include or use a reference voltage and a DC offset voltage to determine the minimum "on" duty time period for the set of buck control bridge switches, and wherein the minimum "on" duty time period is used to maintain a proportional time for an "off" duty time period for the set of boost control bridge switches which is used to maintain a maximum switching ratio.

Aspect 19 can include or use subject matter (such as an apparatus, a system, device, method, article of manufacture, e.g., such as can include a machine-readable medium with encoded instructions for operating a device or performing a method) or can optionally be combined with any of Aspects 1-18, such as to include or use a method of determining a minimum duty cycle for a switched-mode inductive buck-boost voltage regulator, such as by providing a reference signal and splitting the reference signal into a first reference signal and a second reference signal. This can also include comparing a slope compensation signal with the first reference signal to determine the minimum duty cycle for peak boost current mode and comparing the slope compensation signal with the second reference signal to determine a maximum duty cycle for peak buck current mode. A DC offset voltage can be determined by using the first reference signal and the second reference signal. A peak boost current trip time and a peak buck current trip timing can be determined such as by using the DC offset voltage. A duty cycle for peak boost current mode can be determined such as by using the DC offset voltage so that the duty cycle for peak buck current mode stays at its maximum when an output signal becomes higher than an input signal. A duty cycle for peak buck current mode can be determined such as by using the DC offset voltage so that the duty cycle for peak boost current mode stays at its maximum when the output signal becomes lower than the input signal. A transition point of peak boost current mode to peak buck current mode can be determined such as by using a "on" duty time period for the duty cycle.

Aspect 20 can include or use, or can optionally be combined with the subject matter of any of Aspects 1-19, to optionally include or use, in response to an output signal being equal to an input signal, a peak boost current trip that corresponds with a minimum duty cycle and a peak buck current trip that corresponds with a maximum duty cycle and is determined using the DC offset voltage.

Each of these non-limiting examples can stand on its own or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

This document describes a symmetric peak current mode control scheme, such as for a synchronous 4-switch buck-boost regulator. It permits inductor current ($I_L$) sensing, such as using a single current-sensing resistor. The switched mode inductive buck-boost voltage regulator operates by determining if it should run in buck mode, boost mode, or in a buck-boost transition mode. It can be used to perform symmetric peak-current regulation, such as for providing both peak-buck and peak-boost control for modulating the switching duty ratio. When in buck-boost mode, both a peak buck current mode control scheme and a peak boost current mode control scheme can operate concurrently, such as to minimize the "on" duty time in boost mode or to minimize the "off" duty time in buck mode, or both.

One possible advantage over certain other control schemes is that the present scheme can provide a symmetric slope compensation programming approach. This can help to ensure that the 4-switch buck-boost operation can be allowed to run at its minimum switching duty ratio, which leads to lower inductor current ($I_L$) ripple and higher power efficiency than other schemes. Another possible advantage is that the present synchronous 4 switch buck-boost regulator can help enable reverse inductor current ($I_L$) detection, such as for operating in a discontinuous conduction mode. This can include operating the voltage regulator in one or both of a pulse skip mode or a burst mode. Furthermore, by operating only in peak current mode for both buck and boost, the proposed control scheme can help allow a seamless transition between CCM and DCM operation.

Figure 1:
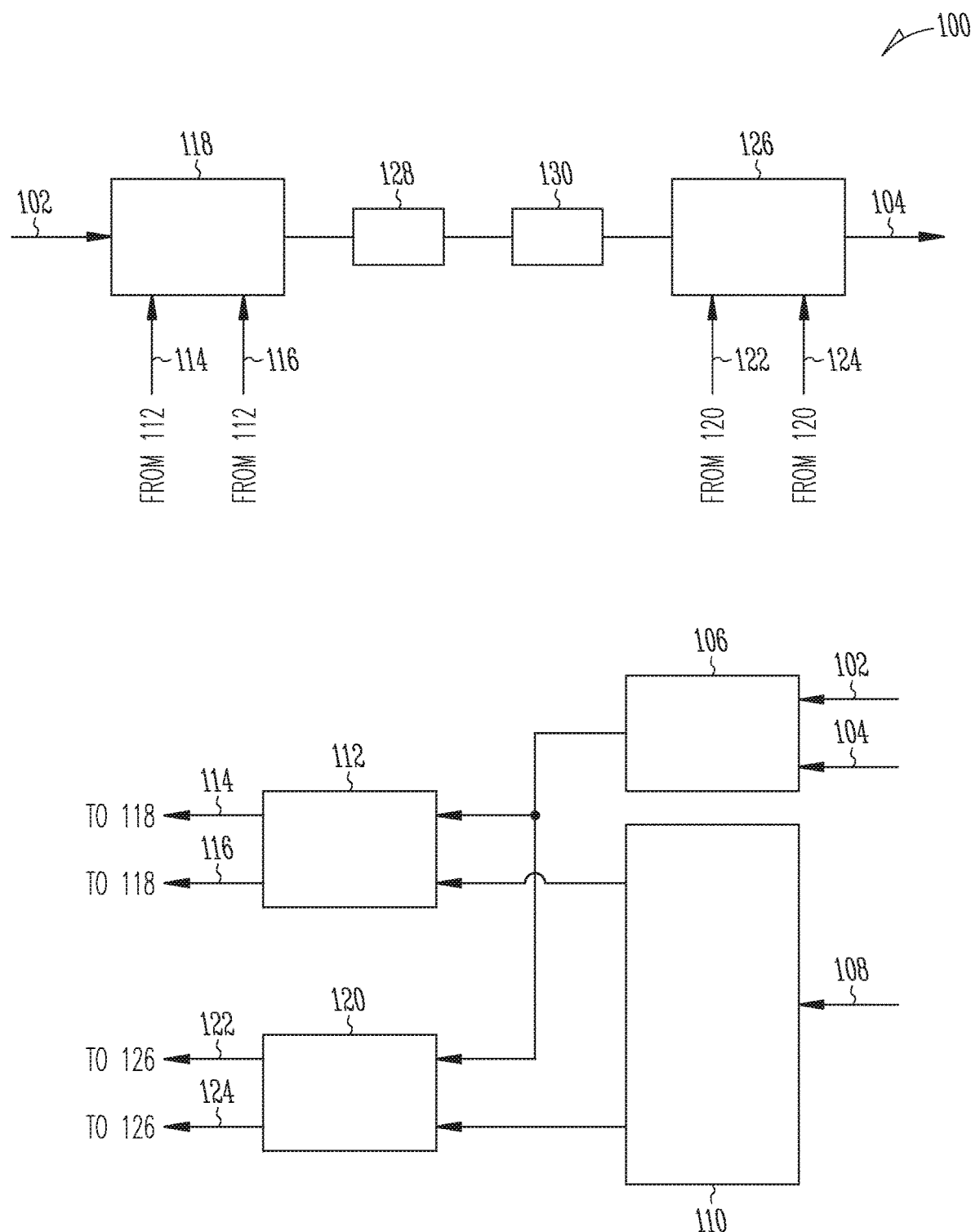
FIG. 1: Block diagram illustrating an example of a proposed symmetric peak current mode control such as for use in a synchronous 4-switch buck-boost regulator.

FIG. 1 shows a block diagram example illustrating blocks of circuitry for use in a synchronous 4 switch buck-boost regulator. Such circuitry can include an inductor 130, a resistor 128, a buck regulator block 118, and a boost regulator block 126. Control circuitry can include peak-buck control 112 circuitry and peak boost control 120 circuitry. A mode selection logic block 106 can include inputs to respectively receive the input voltage 102 and the output voltage 104, A slope compensation generator 110 can include an input to receive a reference input 108. The output of the mode selection logic block 106 is a mode selection signal that determines if the switched-mode inductive buck-boost voltage regulator runs in buck mode, boost mode, or in buck-boost transition mode. The inputs for the peak-buck control 112 and the peak-boost control 120 can be coupled to output signals from the mode selection logic block 106 and the slope compensation generator 110. The output signals of peak-buck control 112 $V_A$ 114 and $V_B$ 116, can be used to control corresponding switches via the buck regulator block 118 which is part of the peak-buck control. Similarly, the output signals from the peak-boost control 120, $V_C$ 122 and $V_D$ 124, can be used to control corresponding switches via the boost regulator block 126 which is part of the peak boost control 120.

Figure 2A:
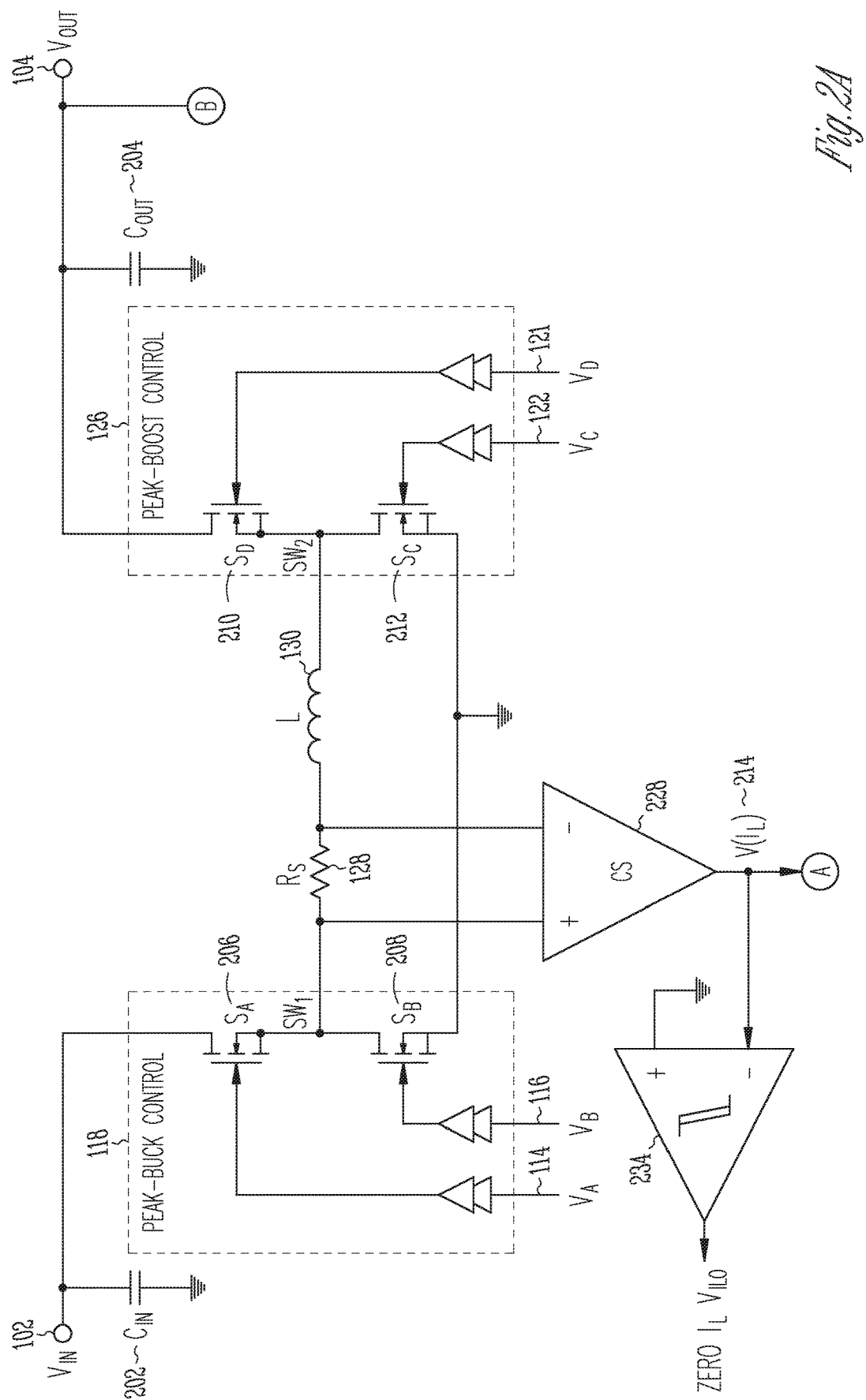
FIG. 2A: Part of a circuit diagram example of the proposed symmetric peak current mode control such as for use in a synchronous 4-switch buck-boost regulator.
Figure 2B:
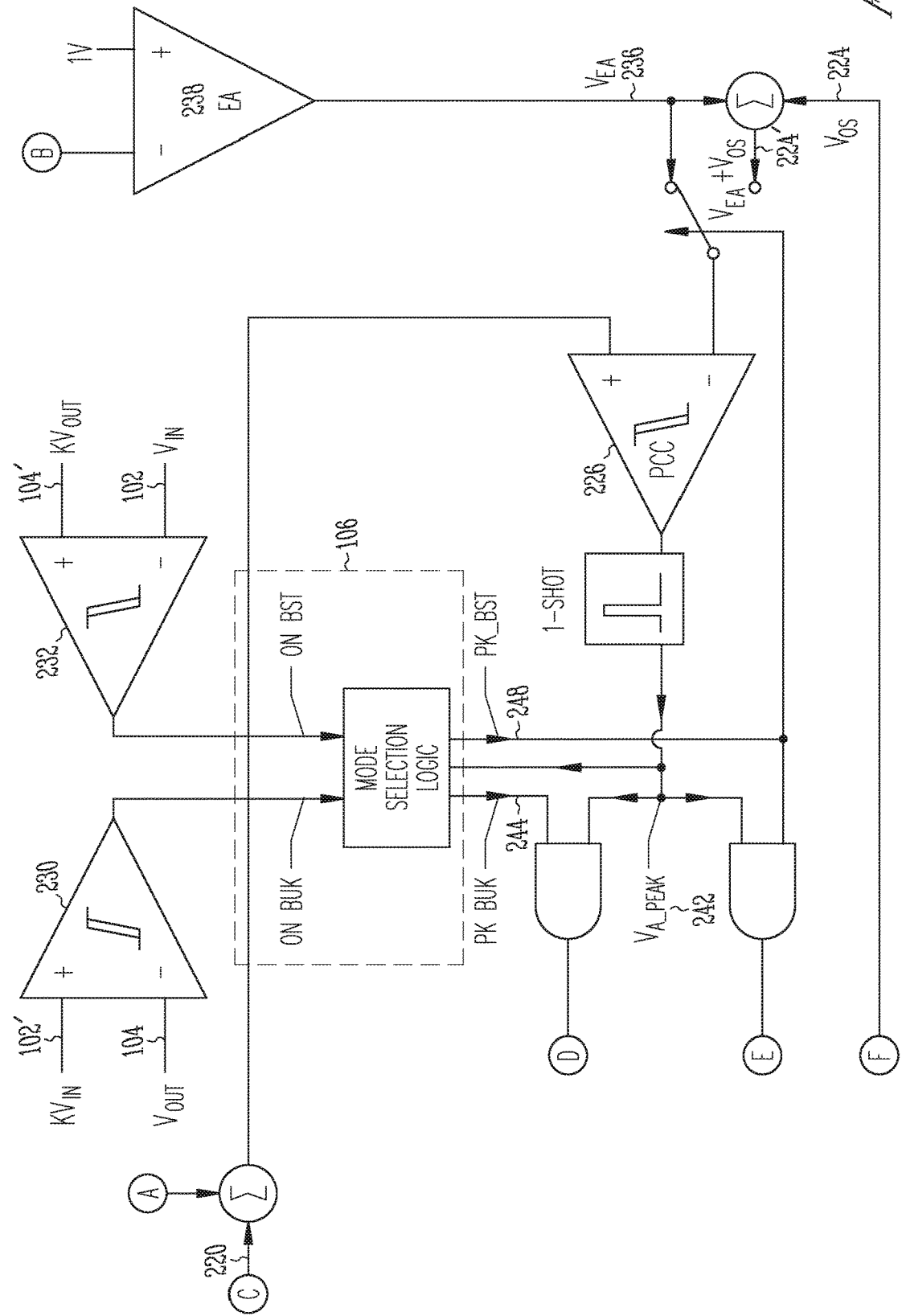
FIG. 2B: Part of a circuit diagram example of the proposed symmetric peak current mode control such as for use in a synchronous 4-switch buck-boost regulator.
Figure 2C:
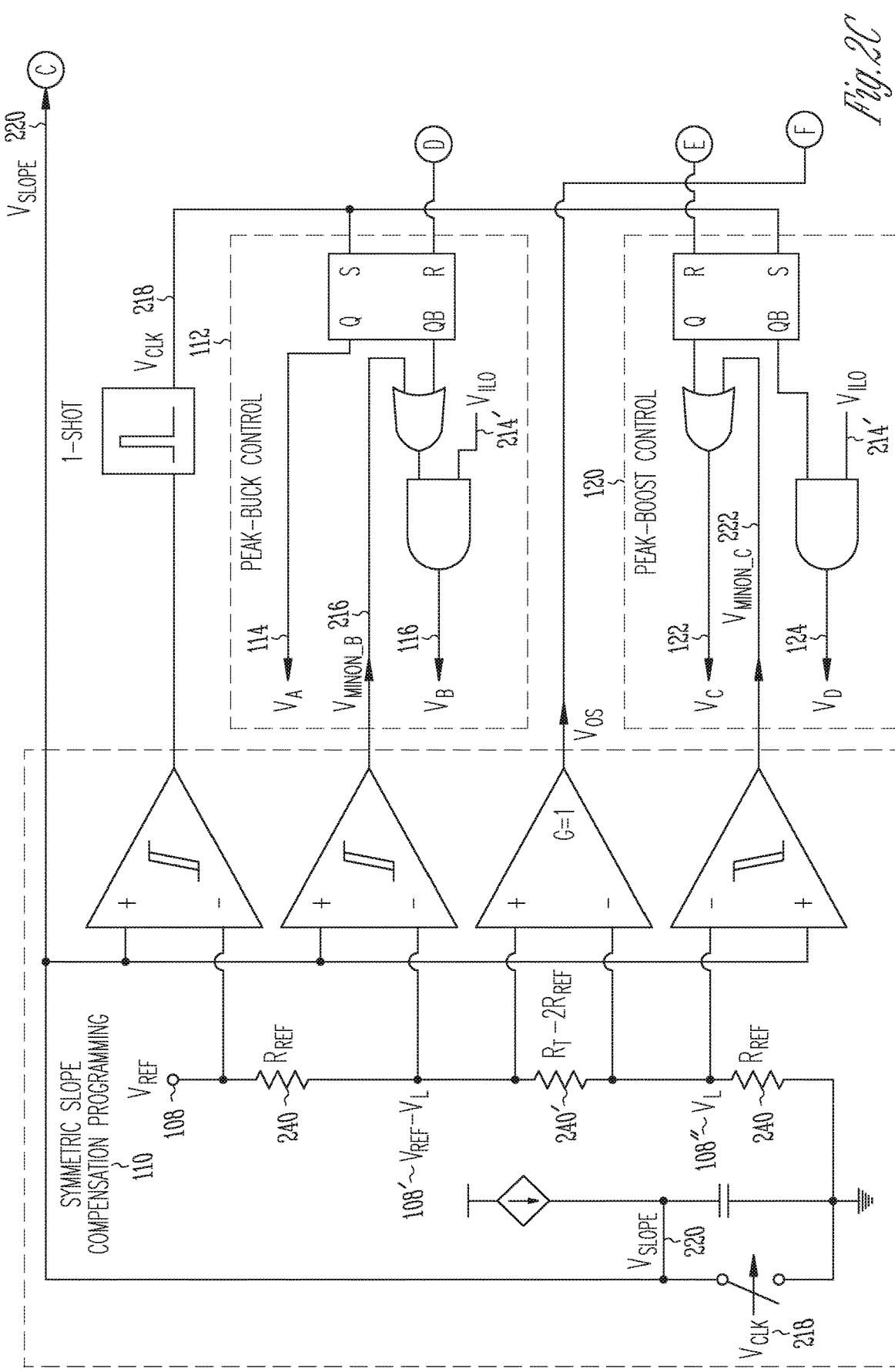
FIG. 2C: Part of a circuit diagram example of the proposed symmetric peak current mode control such as for use in a synchronous 4-switch buck-boost regulator.

FIGS. 2A, 2B, and 2C show a circuit diagram example of the present symmetric peak current mode control, such as for use in a synchronous 4-switch buck-boost regulator. The buck-boost regulator can include an inductor 130, an input capacitor 202, an output capacitor 204, and four power switches $S_A$, $S_B$, $S_C$, and $S_D$ (206, 208, 212, 210), such as can be controlled by the gate signals $V_A$, $V_B$, $V_C$, and $V_D$ (114, 116, 122, and 1214), respectively.

In the present current mode control, the inductor current (214') can be sensed using a current sensor. The current sensor, for example, can be a current sensing resistor 128 in series with the inductor 130. Node voltages at each terminal of the sensing resistor Rs 128 can be fed to respective inputs of a current sensing amplifier 234. The sensed inductor current 214 can be used for both peak-buck and peak-boost current mode control. The buck mode is controlled by the peak current mode buck bridge switches. Therefore, $S_C$ 212 is always "off", and $S_D$ 210 is always "on" for the full duty cycle in pure buck mode. The boost mode is controlled by the peak current mode boost bridge switches where $S_A$ 206 is always "on" and $S_B$ 208 is always "off" for the full duty cycle in pure boost mode. The timing for pure buck mode and pure boost mode is described in more detail below with respect to FIG. 6. When the regulator is in a buck-boost mode, all four switches are controllably switched. The "on" and "off" duty time for the switches controls which mode the regulator is operating in when the input voltage $V_{IN}$ 102 is slightly greater than, equal to, or slightly less than the output voltage $V_{OUT}$ 104. An indication of the sensed inductor current, $V(I_{L0})$ 214, can be summed or otherwise combined with a slope compensation signal ($V_{SLOPE}$) 220 such as to help determine whether the regulator should be run in buck mode, boost mode, or buck-boost mode. This approach can take advantage of the slope compensation circuitry 110 to determine which portion of the duty cycle will be in buck mode and which portion of the duty cycle will be in corresponding boost mode to maintain the desired output voltage. The resulting combined signal ($V_{SLOPE}+V(I_{L0})$) can be fed into an input of a main peak-current comparator (PCC) 226. Such a series-resistor 128 inductor current ($I_L$) sensing architecture can help enable reverse current detection such as for use in DCM (e.g., both pulse skip mode and burst mode).

An input reference voltage ($V_{REF}$) 108 can be used by the slope compensation circuitry 110 to generate a clock signal ($V_{CLK}$) 218 using clock generation circuitry. The clock edge determines the start of the duty cycle for the voltage regulator. The input reference voltage can also be used for generating a minimum time duration for which switches $S_C$ 212 and $S_B$ 208 should be "on" for the respective "on" duty period when in buck-boost mode. In FIG. 2C, the clock signal, $V_{CLK}$ 218, provides a clock pulse when the node voltage $V_{SLOPE}$ 220 has increased enough to reach a voltage reference ($V_{REF}$ 108) indicating the start of the duty cycle. A resistor voltage divider can be provided in series arrangement of resistors. The voltage divider can provide three different voltage references $V_L$ 108", $V_{REF}-V_L$ 108', and $V_{OS}$ 224(shown in FIG. 2B) within the symmetric slope compensation circuitry. Having two matching divider resistors, $R_{REF}$, 240 in the top and the bottom of the voltage divider resistor series, $V_L$ 108" and $V_{REF}-V_L$ 108' can be set to be equal. $V_L$ 108" can be compared to $V_{SLOPE}$ 220. This can include a comparator generating a pulse signal, $V_{MINON\_C}$, where its on-duty period sets a minimum on-time ($t_{MINON\_C}$) which is the period for $S_C$ switches. Similarly, $V_{REF}-V_L$ 108' can be compared to $V_{SLOPE}$ 220. This can include generating a pulse signal, $V_{MINON\_B}$ 216, where its on-duty period sets a minimum on-time ($t_{MINON\_B}$) which is the period that $S_B$ is switched on. When $V_L$ 108" and $V_{REF}-V_L$ 108' are identical, that will cause the on-time of $V_{MINON\_C}$ 222 and $V_{MINON\_B}$ 216 to also be identical. The symmetric slope compensation programming sets $V_{MINON\_B}$ 216 and $V_{MINON\_C}$ 222, which are equal and symmetric in time when $V_L$ 108" and $V_{REF}-V_L$ 108' are identical. This will be the case using the voltage divider to determine $V_L$ 108" and $V_{REF}-V_L$ 108' based on $V_{REF}$. A DC offset voltage ($V_{OS}$) 224 can be generated as the voltage difference between $V_L$ 108" and $V_{REF}-V_L$ 108'. This $V_{OS}$ can be added to error amplifier (EA) 238 output ($V_{EA}$ 236), generating an alternative peak current control signal ($V_{EA}+V_{OS}$) 224'. The signal $V_{EA}$ 236 can be used to control the peak-boost current mode control. The alternative peak current control signal 224' can be used to control the peak-buck current mode control.

Figure 3A:
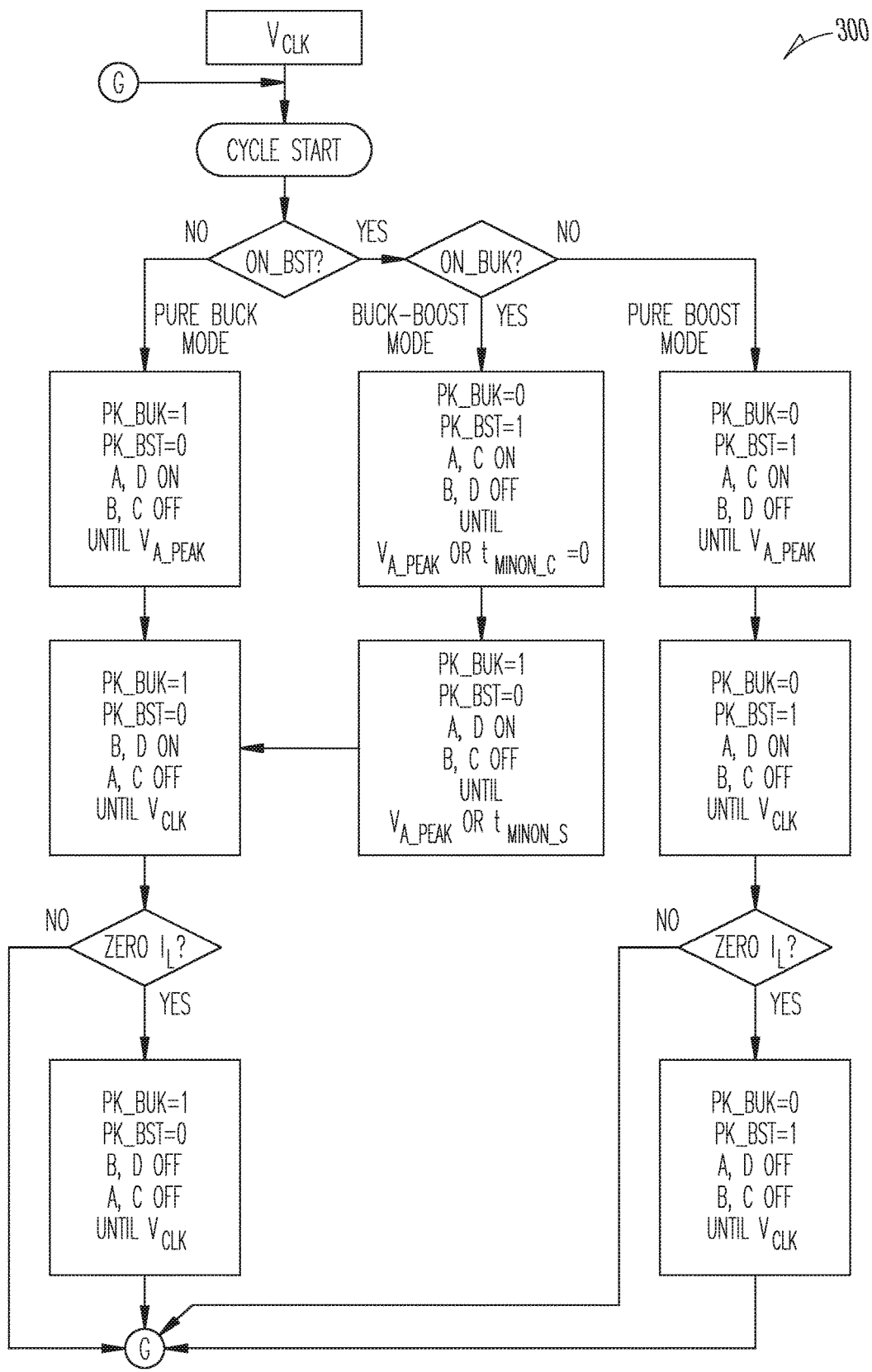
FIG. 3A: Mode selection logic control flow chart example of the proposed control scheme.

FIG. 3A is a flow chart for the mode selection. The mode selection can be used to determine, at the start of the cycle, what the active mode of the voltage regulator should be based on the input signal and output signals. The active mode of the regulator is set for boost mode (also referred to as peak-boost mode), buck mode (also referred to as peak-buck mode), or buck-boost transition mode (also referred to as buck-boost mode). Peak-boost mode is when the regulator boosts the output voltage higher than the input voltage. In pure peak-buck mode, only two switches, $S_A$ 206 and $S_B$ 208, are alternatingly turned on. Peak-buck mode is when the regulator bucks the output voltage such that it is lower than the input voltage. In pure peak-buck current mode control, $S_C$ 212 is turned off and $S_D$ 210 is turned on for the whole switching cycle. Buck-boost transition mode alternates which switches are turned on depending on whether the voltage needs to be bucked to a lower voltage or a boosted to a lower voltage.

In some examples, two comparators, a buck setting comparator 230 and a boost setting comparator 232, can respectively sense the regulator's input signal 102 and output signal 104 voltages and can set the logic outputs. The buck comparator 230 output (ON_BUK) of the buck setting comparator 232 is set to turn on the buck mode. The boost comparator output (ON_BST) of the boost setting comparator 232 is set to turn on the boost mode. The mode selection logic block 106 obtains and uses the results of ON_BST and ON_BUK to set two peak-current mode logic signals, PK_BST 248 and PK_BUK 244, such as according to the selection mode logic diagram shown in FIG. 3A.

In some examples as shown in FIG. 3A, ON_BST can be determined before ON_BUCK. If ON_BST is set to 0, the selection mode logic used by the selection logic block 106 determines that the voltage regulator is to operate in peak-buck mode. ON_BST set to 1 means the peak-boost mode is switched on or set to "active." ON_BST occurs when $V_{OUT}$ 104>k×$V_{IN}$ 102'. ON_BUK being set to 1 means the peak-buck mode is switched on. ON_BUK occurs when $V_{IN}$ 102>k×$V_{OUT}$ 104'. For both cases k is the maximum switching duty ratio during any switching period. If both ON_BUK and ON_BST are set to 1, then buck-boost mode is selected by the selection logic block 106.

The selection mode logic diagram shown in FIG. 3A is used within the selection mode block 106 to determine the voltage regulator mode by using the output of the buck setting comparator 230 and boost setting comparator 232 such as to select which mode the voltage regulator should operate in in the operating cycle. The output of the selection mode block 106 is fed into the peak-buck control 112 and the peak-boost control 120, which send the signal to the bridge switches to turn on and off particular switches to operate the voltage regulator. In each switching cycle (A), the control scheme technique first checks whether the peak-boost phase is set to active. ON_BST is set to active when ON_BST=1. If not (ON_BST=0), the regulator operates in the pure peak-buck mode (PK_BUK=1 and PK_BST=0). In pure peak-buck mode, only two switches, $S_A$ 206 and $S_B$ 208, are alternatingly turned on, per peak-buck current mode control, while $S_C$ 212 is turned off and $S_D$ 210 is turned on for the whole switching cycle. When ON_BST is set to active (ON_BST=1), then the process checks whether the buck phase is active (ON_BUK=1). If both ON_BST and ON_BUK are set to active (ON_BST=1 and ON_BUK=1), then buck-boost mode is set to active. This starts in peak-boost mode (PK_BUK=0 and PK_BST=1). Therefore $S_C$ 212 is on and $S_D$ 210 is alternatingly turned on, per peak-boost current mode control, until either $V_{A\_PEAK}$ 242 is triggered or $T_{MINON\_C}$=0. During this time $S_A$ 206 is set to always be on and $S_B$ 208 is always off until either $V_{A\_PEAK}$ 242 or $T_{MINON\_B}$ is triggered transitioning into peak-buck mode (PK_BUCK=1 and PK_BST=0). Peak-buck mode operates as described above until the clock $V_{CLK}$ 218 has finished the duty cycle. If after determining boost mode should be active but buck mode is not active (ON_BST=1, ON_BUK=0), the regulator operates in the pure boost mode (PK_BUK=0 and PK_BST=1). In this mode, only two switches, $S_C$ 212 and $S_D$ 210, are alternatingly turned on, per peak-boost current mode control while $S_A$ 206 is turned on and $S_B$ 208 is turned off for the whole switching cycle. When operating in DCM upon detecting zero $I_L$ ($I_L$=0) 214' all bridge switches are turned off for the rest of the clock cycle.

Figure 3B:
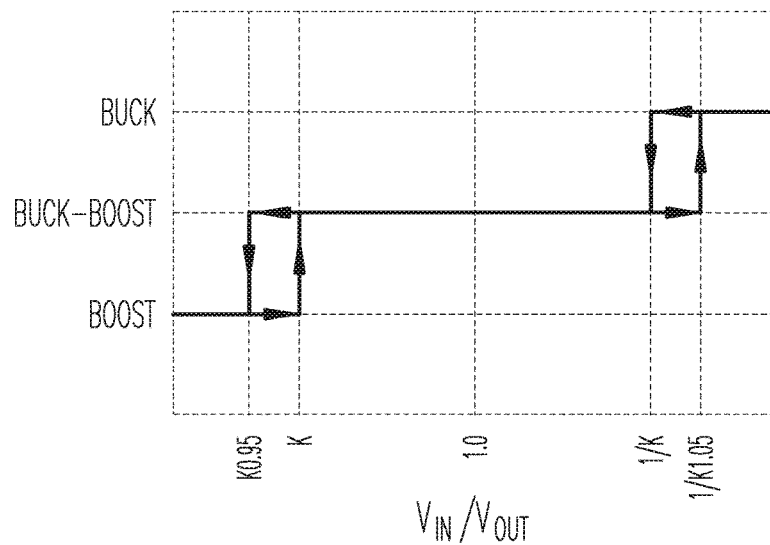
FIG. 3B: Mode selection logic waveforms of an example of the proposed control scheme.
Figure 3B:
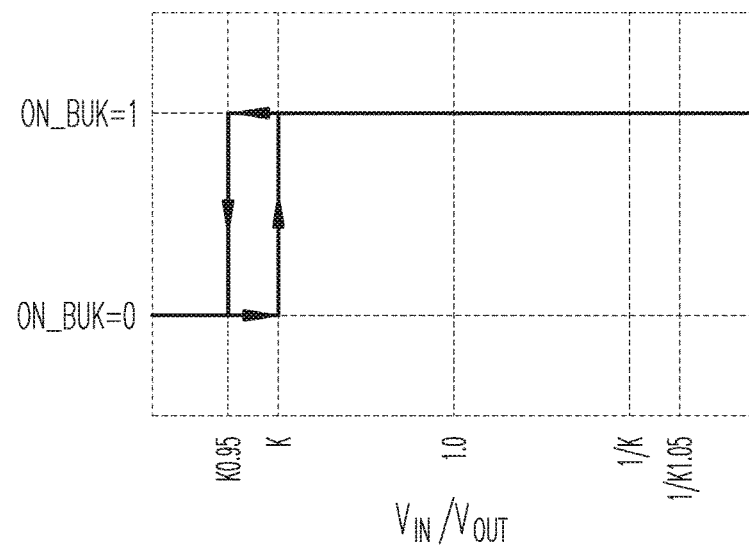
Figure 3B:
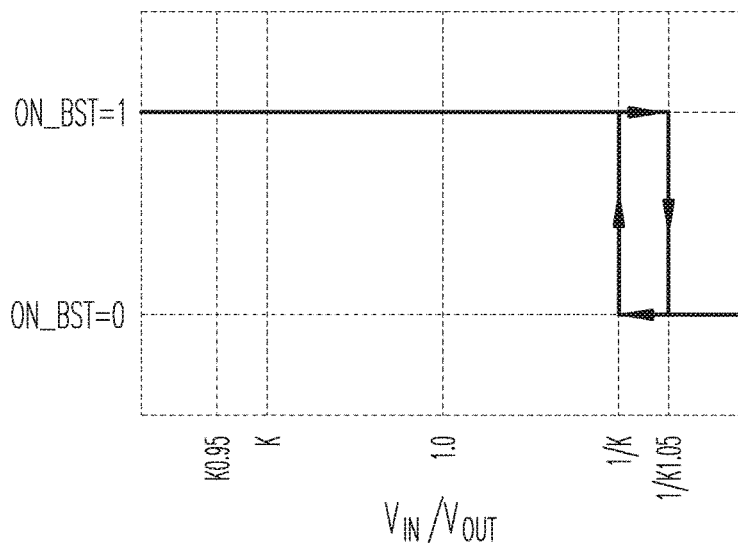

FIG. 3B depicts the relationship between the output of the comparators and the mode selection. Graph 302 shows the mode selection, pure peak-buck selection is shown in graph 304, and pure peak-boost selection is shown in graph 306. Hysteresis can be added to the mode selection, such as shown in the FIG. 3B waveform. Hysteresis can help inhibit or prevent oscillation between mode transitions. When ON_BST is set to 1 or "active" in graph 306 but ON_BUK is not set or "inactive" in graph 304, then the corresponding boost mode is selected in graph 302. When both ON_BST and ON_BUCK are set to 1 or "active" in graphs 306 and 304 respectively, the corresponding graph 302 selects the buck-boost mode. When ON_BST is not set or is "inactive" in graph 306 and ON_BUK is set to 1 or "active" in graph 304, then the corresponding graph 302 has the buck mode selected.

Figure 4:
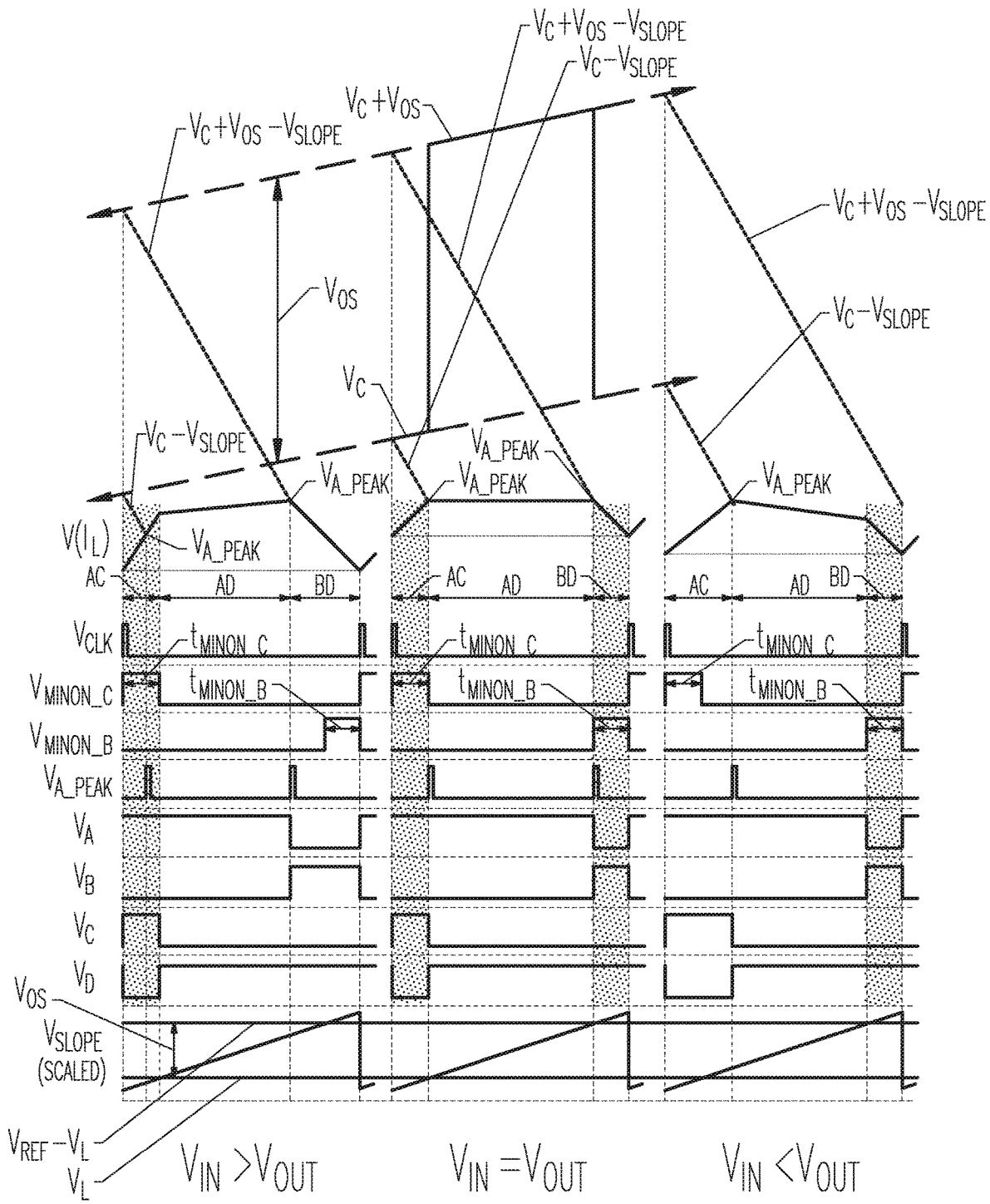
FIG. 4: Operation waveforms of an example of the proposed symmetric peak current mode control scheme in 4-switch buck-boost mode.

FIG. 4 is waveform diagram that shows an example of how the voltage regulator can operate in the 4-switch buck-boost mode. For example, this mode can be selected when both ON_BST is set to 1 and ON_BUK is set to 1. A symmetrical peak-buck and peak-boost switching operation is made when $V_{IN}$ 102 is equal to $V_{OUT}$ 104. At the rising edge of $V_{CLK}$ 218, the presented mode selection logic initially sets PK_BST to 1, PK_BUK is set to 0, and the output of comparator EA 238, $V_{EA}$ 236, is set to be directly connected to the input of the peak-current comparator. First, $S_A$ 206 and $S_C$ 212 are turned on, also known as the AC phase, and $I_L$ ramps up. When the sensed $V(I_L)$ increases to the difference between $V_{EA}$ and $V_{SLOPE}$, the peak-current comparator 226 trips and $V_{A\_PEAK}$ is set to 1 or "active" and $S_C$ 212 is turned off and $S_D$ 210 is turned on. This is shown by the AD phase in the waveform diagram in FIG. 4. At the rising edge of $V_{A\_PEAK}$ 242, the mode selection logic sets PK_BST to 0, PK_BUK to 1, and $V_C$ is to be summed with $V_{OS}$ 224. Since $V_{EA}$ 236 jumps up by $V_{OS}$ 224, $V_{A\_PEAK}$ 242 will be reset to 0. When $V(I_L)$ 214 then increases to a level $V_{EA}$+$V_{OS}$ 224' that is compensated by $V_{SLOPE}$ (=$V_{EA}$+$V_{OS}$−$V_{SLOPE}$), the comparator trips again, giving a second $V_{A\_PEAK}$ 242, and $S_A$ 206 is turned off and $S_B$ 208 is turned on until the next clock cycle. This is shown by the BD phase of the waveform diagram of FIG. 4, where the BD phase corresponds with $S_B$ 208 and $S_D$ 210 being turned on.

When the $V_{IN}$ 102 and $V_{OUT}$ 104 are the same or substantially similar this turns on the buck-boost phase which means that both the AC phase and BD phase are set to be on for an equal symmetrical amount of time as depicted in FIG. 4 when input voltage $V_{IN}$ 102 is equal to output voltage $V_{OUT}$ 104. AC phase and BD phase are set when the symmetric slope compensation generator 110 uses a comparator to set $V_{MINON\_C}$ 222 and $V_{MINON\_B}$ 216, which set the minimum on-time periods for $S_C$ 122 and $S_B$ 124 switches, $t_{MINON\_C}$ and $t_{MINON\_B}$, that are equal and symmetric in time. $V_{OS}$ 224 is generated by considering the difference between two reference voltages $V_L$ 180" and $V_{REF}$−$V_L$ 180'. This difference can be used to generate $V_{MINON\_C}$ 222 and $V_{MINON\_B}$ 216. The same $V_{SLOPE}$ 220 signal can be used for both the slope compensation in peak-current mode control and for a timing control voltage for $t_{MINON\_C}$ and $t_{MINON\_B}$. In some examples, −$V_{OS}$ 224 and the slope of $V_{SLOPE}$ 220 are proportional to each other, since they are both set by the same $V_{REF}$ 108. In such case, the timing difference between the first and the second $V_{A\_PEAK}$ 242 is set by $V_{OS}$ 236 and it can be expressed as:

$$\Delta t(V_{A\_PEAK}) = t_S - (t_{MINON\_C} + t_{MINON\_B})$$

where $\Delta t(V_{A\_PEAK})$ is the time difference between the two $V_{A\_PEAK}$ triggers and $t_S$ is a switching period. The first $V_{A\_PEAK}$ 242 is triggered after $t_{MINON\_C}$ period and the second $V_{A\_PEAK}$ 242 is triggered just before $t_{MINON\_B}$. This can help enable the 4-switch buck-boost operation to run at its minimum switching duty ratio. Furthermore, the minimum switching duty ratio is symmetrical for the periods for the AC phase and the BD phase. Therefore, there is improved efficiency because $I_L$ ripple current amplitude 130 is also at a minimum.

FIG. 4 shows that when $V_{IN}$ 102 goes higher than $V_{OUT}$ 104, EA 238 will eventually lower $V_{EA}$ 236 resulting in $V_{A\_PEAK}$ 242 triggering earlier in time. Then, the BD phase will adaptively expand while the AC phase is still fixed at its minimum as the first $V_{A\_PEAK}$ 242 is pushed inside of $t_{MINON\_C}$. The inductor current $I_L$ 130 ripple is still at a minimum, allowing for improved efficiency.

FIG. 4 shows that when $V_{IN}$ 102 goes lower than $V_{OUT}$ 104, EA 238 will lift $V_{EA}$ 236 such that $V_{A\_PEAK}$ 242 triggers later in time. In this case, the AC phase will adaptively expand while the BD phase is still fixed at its minimum duty as the second $V_{A\_PEAK}$ 242 pushed out from $t_{MINON\_B}$. In this condition, as with the other conditions, the voltage regulator still has a minimum $I_L$ 130 ripple and improved efficiency.

Figure 5:
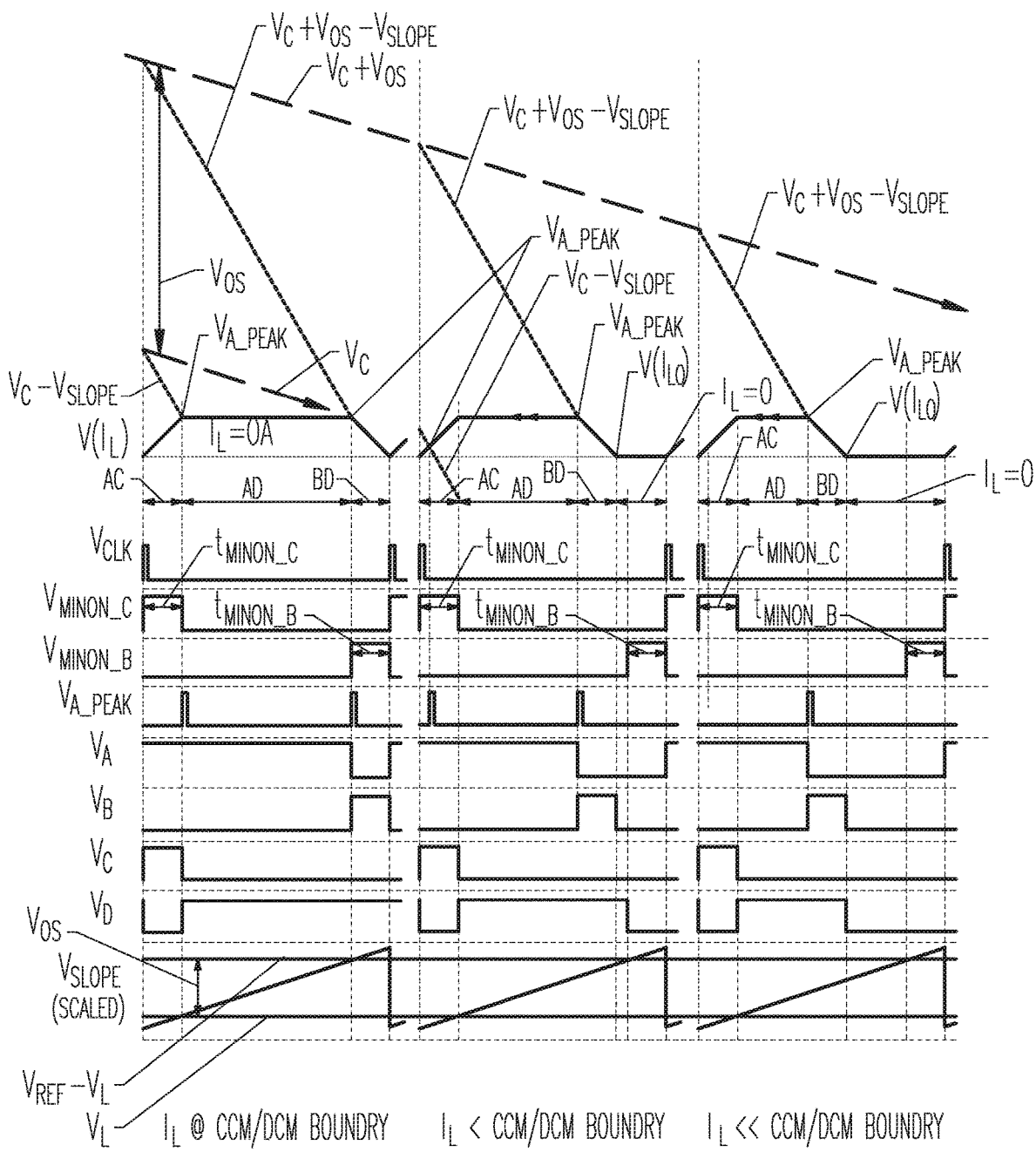
FIG. 5: Operation waveforms of an example of the proposed symmetric peak current mode control scheme in 4-switch buck-boost mode for CCM and DCM transition.

FIG. 5 is a waveform diagram that demonstrates an example of the operation waveform when the present control scheme transitions between CCM and DCM. The proposed scheme operates in peak current mode for both buck mode and boost mode, therefore this scheme has optimum DCM implementation. When the regulator's output load is reduced, the relationship between $V_{EA}$ 236 and the output signal $-V_{OUT}$ 104 will cause the system to transition between CCM and DCM in response to the drop of $V_{EA}$ 236 and $V_{EA}+V_{OS}$ 224'. These two signals control the regulation cycle of $V_{A\_PEAK}$ 242. Until the load and $I_L$ decrease to the CCM and DCM boundary, the control scheme still operates such as described in FIG. 4. As shown in FIG. 5, the efficiency for light loads is improved as the regulator system transitions from CCM to DCM because when $I_L$ 214' decreases, $V_{EA}$ 236 will also continue to drop, such that $V_{A\_PEAK}$ 242 triggers earlier in time. In order to obtain the minimum AC phase, $V_{A\_PEAK}$ 242 is pushed inside of $t_{MINON\_C}$. By pushing $V_{A\_PEAK}$ 242 inside of $t_{MINON\_C}$ the AC phase has a minimum "on" time within the duty cycle. As shown in the middle and far right waveforms of FIG. 5, the AD phase will shrink as the second $V_{A\_PEAK}$ 242 trips earlier while the BD phase stays the same as the reverse inductor current $I_L$ comparator triggers, $V(I_{L0})=1$. As $I_L$ 214' decreases linearly, the AD phase will also shrink proportional. Ideally this relationship will be linear while the duration of the AC phase and the BD phase stay the same. This can help achieve a smooth drop of the charge transfer to the load in each switching cycle.

The voltage regulator can be configured to operate only in peak current mode for both buck mode and boost mode, thus providing the easy implementation and improved performance for DCM in different modes (e.g., pulse skip mode and burst mode) as well as transitioning smoothly from CCM to DCM.

Figure 6A:
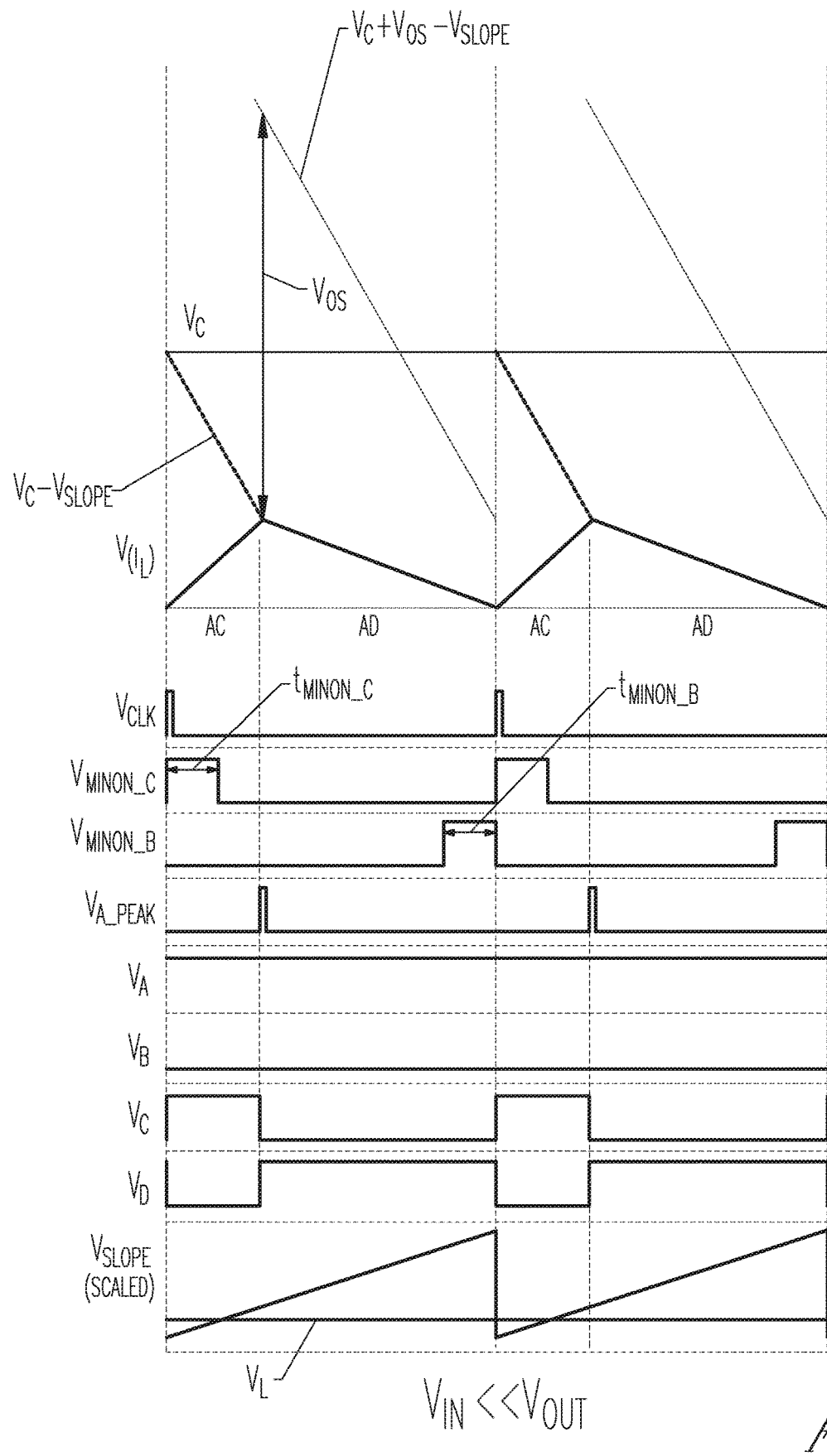
FIG. 6A: Operation waveforms of an example of the proposed symmetric peak current mode control scheme in a 2-switch pure peak-boost mode.
Figure 6B:
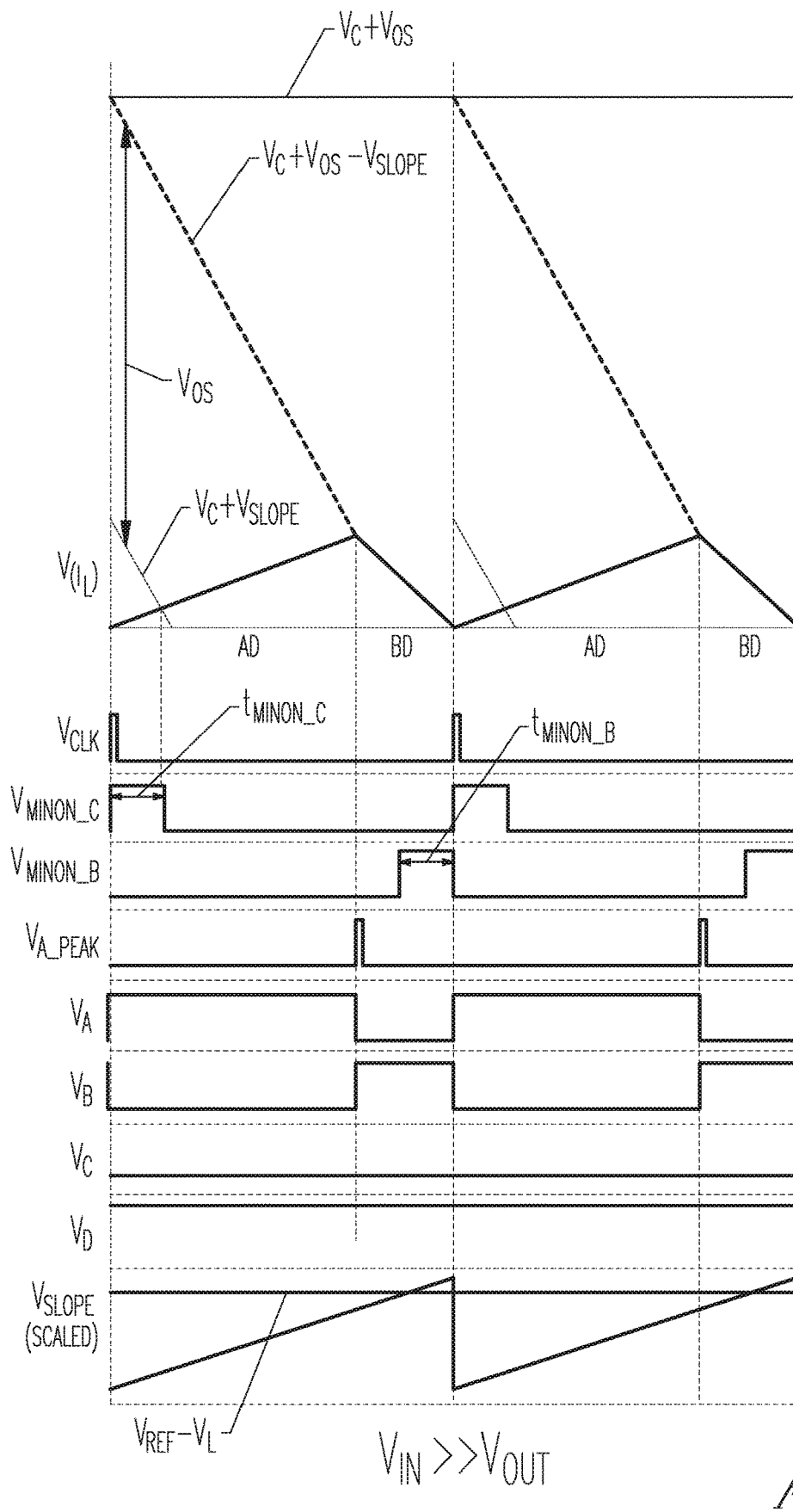
FIG. 6B: Operation waveforms of an example of the proposed symmetric peak current mode control scheme in a 2-switch pure peak-buck mode.

FIGS. 6A and 6B are examples of a waveform diagram of operating in a 2-switch pure peak-boost current mode or pure peak-buck current mode. Operating in pure peak-boost current mode or in pure peak-buck current mode occurs when $V_{IN}$ 102 is either much lower or much higher than $V_{OUT}$ 104. When $V_{IN}$ 102 is much lower than $V_{OUT}$ 104 (FIG. 6A) the voltage regulator operates in pure peak-boost current mode. In the pure boost mode (PK_BST=1, PK_BUK=0), the output of EA 238, $V_{EA}$ 236, is directly connected to the input of the peak-current comparator 226, validating only $V_{EA}-V_{SLOPE}$ to trigger $V_{A\_PEAK}$ 242. As a result, $S_C$ 212 and $S_D$ 210 are alternately turned on per peak-boost current mode control while $S_A$ 206 is turned on and $S_B$ 208 is turned off for the whole switching cycle. When $V_{IN}$ 102 is much higher than $V_{OUT}$ 104 (FIG. 6B), the voltage regulator operates in a pure peak-buck current mode. In the pure peak-buck mode (PK_BUK=1 and PK_BST=0), $V_{EA}$ 236 is summed with $V_{OS}$ 224, validating only $V_{EA}+V_{OS}-V_{SLOPE}$ to trigger $V_{A\_PEAK}$ 242. Therefore, $S_A$ 206 and $S_B$ 208 are alternately turned on per peak-buck current mode control while $S_C$ 212 is turned off and $S_D$ 210 is turned on for the whole switching cycle.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. Circuitry for providing switched-mode inductive buck-boost voltage regulation via a H-bridge arrangement of an inductor, a resistor, and a group of bridge switches, the H-bridge including an input terminal receiving an input signal and an output terminal providing an output signal, the circuitry comprising:
   controller circuitry which operates the group of bridge switches selectively using a buck mode, a boost mode, and a buck-boost mode, by providing respective mode selection signals to a set of buck bridge switches and a set of boost bridge switches in the group of bridge switches, the controller circuitry including:
      a buck mode, in which the set of buck bridge switches is determined by a peak buck current mode control scheme and the set of boost bridge switches uses 0% of an "on" duty time of a duty cycle;
      a boost mode, in which the set of boost bridge switches is determined by a peak boost current mode control scheme and the set of buck bridge switches uses 0% of an "off" duty time of the duty cycle;
   a buck-boost mode, in which the set of buck bridge switches are determined by the peak buck current mode control scheme and the set of boost bridge switches are determined by the peak boost current mode control scheme, operating concurrently to at least one of: (1) minimize the "on" duty time for the set of boost bridge switches or (2) minimize the "off" duty time for the set of buck bridge switches when the output signal is equal to the input signal; and
   a symmetric slope compensation circuitry timing a peak buck current trip and a peak boost current trip to equalize the "on" duty time for the set of boost bridge switches to the "off" duty time of the set of buck bridge switches in the buck-boost mode when the output signal is equal to the input signal.

2. The circuitry of claim 1, wherein the "on" duty time for the set of boost bridge switches and the "off" duty time for the set of buck bridge switches are used to determine a maximum switching duty ratio.

3. The circuitry of claim 2, comprising a clock circuit configured to generate a clock pulse in response to a slope compensation signal reaching a reference voltage, wherein the clock pulse determines a start of a duty cycle.

4. The circuitry of claim 2, the controller circuitry includes or is coupled to a first comparator and a second comparator, wherein:
   (A) the first comparator is used to provide a first comparator output based on a difference between (1) the input signal and (2) the output signal modified by the maximum switching duty ratio;
   (B) the second comparator is used to provide a second comparator output based on a difference between (1) the output signal and (2) the input signal modified by the maximum switching duty ratio; and
   wherein the first comparator output and the second comparator output are used to select between operation in the buck mode, the boost mode, or the buck-boost mode.

5. The circuitry of claim 1, wherein the resistor is in series with the inductor for sensing a current of the inductor.

6. The circuitry of claim 1, where the controller circuitry includes multiple comparisons operating together for minimizing the "on" duty time for the set of boost bridge switches and minimizing the "off" duty time for the set of buck bridge switches.

7. The circuitry of claim 1, comprising a voltage divider that derives a DC offset voltage from a reference voltage to determine a peak boost duty cycle to maintain a peak buck duty cycle at its maximum.

8. The circuitry of claim 1, wherein the symmetric slope compensation circuitry is used to determine a minimum duty cycle for a switched-mode inductive buck-boost voltage regulator by:
   providing a reference signal and splitting the reference signal into a first reference signal and a second reference signal;
   comparing a slope compensation signal with the first reference signal to determine the minimum duty cycle for peak boost current mode;
   comparing the slope compensation signal with the second reference signal to determine a maximum duty cycle for peak buck current mode;
   determining a DC offset voltage using the first reference signal and the second reference signal;
   determining a peak boost current trip time and a peak buck current trip timing using the DC offset voltage;
   determining the peak boost current trip corresponds with a minimum duty cycle and a peak buck current trip corresponds with a maximum duty cycle in response to an output signal being equal to an input signal;
   determining a duty cycle for peak boost current mode using the DC offset voltage so that duty cycle for peak buck current mode stays at its maximum when an output signal becomes higher than an input signal;
   determining a duty cycle for peak buck current mode using the DC offset voltage so that the duty cycle for peak boost current mode stays at its maximum when the output signal becomes lower than the input signal; and
   determining a transition point of peak boost current mode to peak buck current mode using a "on" duty time period for the duty cycle.

9. A method of using a voltage regulator to smoothly transition between discontinuous conduction mode (DCM) and continuous conduction mode (CCM), the method comprising:
  sensing an inductor current;
  selecting an operating mode of the voltage regulator to be one of peak buck current control mode, peak boost current control mode, or buck-boost current control mode based at least in part on an input signal, an output signal, and a maximum switching ratio using a minimum "on" duty time period for a set of boost control bridge switches and a minimum "off" duty time period for a set of buck control bridge switches, the minimum "on" duty time period is determined using a reference voltage and a DC offset voltage, the minimum "on" duty time period is used to maintain a proportional time for a "off" duty time period for the set of boost control bridge switches; and
  transitioning the voltage regulator into DCM in response to the inductor current becoming zero or out of DCM in response to the inductor current becoming non-zero.

10. The method of claim 9, wherein the buck-boost current control mode further comprises:
  measuring a first voltage of a slope compensation signal and comparing the first voltage of the slope compensation signal with a second voltage of a first reference signal to determine a minimum "on" duty time for peak boost current control mode; and
  comparing the first voltage of the slope compensation signal with a second reference signal to determine a minimum "off" duty time period for peak buck current control mode.

11. The method of claim 9, comprising determining a minimum duty cycle by:
  splitting a reference voltage into a first reference voltage and a second reference voltage;
  determining a DC offset voltage using the first reference voltage and the second reference voltage;
  determining a maximum time for a duty cycle using the DC offset voltage;
  comparing the voltage of a slope compensation signal with a difference of the voltage of a first reference signal and a second reference signal to determine a peak boost time as a portion of the duty cycle; and
  comparing the voltage of a slope compensation signal with the second reference voltage, wherein the second reference voltage is derived from an input reference voltage, to determine a "on" duty time period for buck control bridge switches that is a symmetrical proportion of the duty cycle to the minimum "on" duty time period for boost control bridge switches.

12. The method of claim 11, further comprising determining a peak buck current trip timing using the DC offset voltage so that a peak boost current trip occurs at the minimum "on" duty time period for the peak boost current control mode and a peak buck current trip occurs at the minimum "off" duty time period for the peak buck current control mode when the output signal is approximately equal to the input signal.

13. The method of claim 9, wherein selecting the operating mode of the voltage regulator further includes determining at least one of a clock signal, or an input signal and an output signal.

14. The method of claim 13, wherein selecting the operating mode further comprises:
  determining a difference between the input signal and output signal.

15. The method of claim 10, further comprising:
  comparing a slope compensation signal with a first reference signal to determine a minimum "on" duty time period for peak buck; and
  comparing the slope compensation signal with a second reference signal to determine a minimum "off" duty time period for peak boost.

16. The method of claim 9, wherein an indication of a sensed inductor current is summed with a slope compensation signal to produce a summed signal; and
  the summed signal used as an input for determining the operating mode.

17. A method of determining a minimum duty cycle for a switched-mode inductive buck-boost voltage regulator, the method comprising:
  providing a reference signal and splitting the reference signal into a first reference signal and a second reference signal;
  comparing a slope compensation signal with the first reference signal to determine the minimum duty cycle for peak boost current mode;
  comparing the slope compensation signal with the second reference signal to determine a maximum duty cycle for peak buck current mode;
  determining a DC offset voltage using the first reference signal and the second reference signal;
  determining a peak boost current trip time and a peak buck current trip timing using the DC offset voltage;
  determining a duty cycle for peak boost current mode using the DC offset voltage so that duty cycle for peak buck current mode stays at its maximum when an output signal becomes higher than an input signal;
  determining a duty cycle for peak buck current mode using the DC offset voltage so that the duty cycle for peak boost current mode stays at its maximum when the output signal becomes lower than the input signal; and
  determining a transition point of peak boost current mode to peak buck current mode using a "on" duty time period for the duty cycle.

18. A method of claim 17, wherein in response to an output signal being equal to an input signal, a peak boost current trip corresponds with a minimum duty cycle and a peak buck current trip corresponds with a maximum duty cycle and is determined using the DC offset voltage.

* * * * *